United States Patent [19]

Kobayashi

[11] 3,821,788

[45] June 28, 1974

[54] COLOR SYNCHRONIZING SIGNAL GENERATING DEVICE

[75] Inventor: Yoshikazu Kobayashi, Kawasaki, Japan

[73] Assignee: Nippon Columbia Kabushikikaisha (Nippon Columbia Co., Ltd.), Tokyo, Japan

[22] Filed: Dec. 4, 1972

[21] Appl. No.: 312,196

[52] U.S. Cl. .......................... 358/19, 178/69.5 CB

[51] Int. Cl. .......................... H04n 9/46

[58] Field of Search. 178/5.4 AC, 5.4 HE, 69.5 TV, 178/69.5 CB, 69.5 G; 331/20

[56] References Cited

UNITED STATES PATENTS 3,532,810 10/1970 Steinberg.................... 178/69.5 TV

*Primary Examiner*—Richard Murray

*Attorney, Agent, or Firm*—Hill, Gross, Simpson, Van Santen, Steadman, Chiara & Simpson

[57] ABSTRACT

A synchronizing signal generating device in which a 3.58 MHz burst signal is extracted from an external NTSC color composite signal with a burst flag signal and the burst signal of 3.58 MHz is continuously oscillated. In this case, a signal separated from synchronizing signals in synchronized relationship is subtracted therefrom by the 3.58 MHz of the burst signal, this subtracted signal is counted down to produce the vertical synchronizing signal, and the synchronizing signal is obtained from the vertical synchronizing signal in gen-locked condition.

5 Claims, 34 Drawing Figures

COLOR SYNCHRONIZING SIGNAL GENERATING DEVICE

BACKGROUND OF THE INVENTION

This invention relates to a color synchronizing signal generating device with which a horizontal drive signal, a horizontal blanking signal, a burst flag signal and so on for use in color television image pickup apparatus are derived from an NTSC color video signal, and more particularly to a color synchronizing signal generating device which is simple in construction and capable of obtaining a color synchronizing signal of accurate phase relation without adjustment.

DESCRIPTION OF THE PREFERRED EMBODIMENTS

Figure 2:
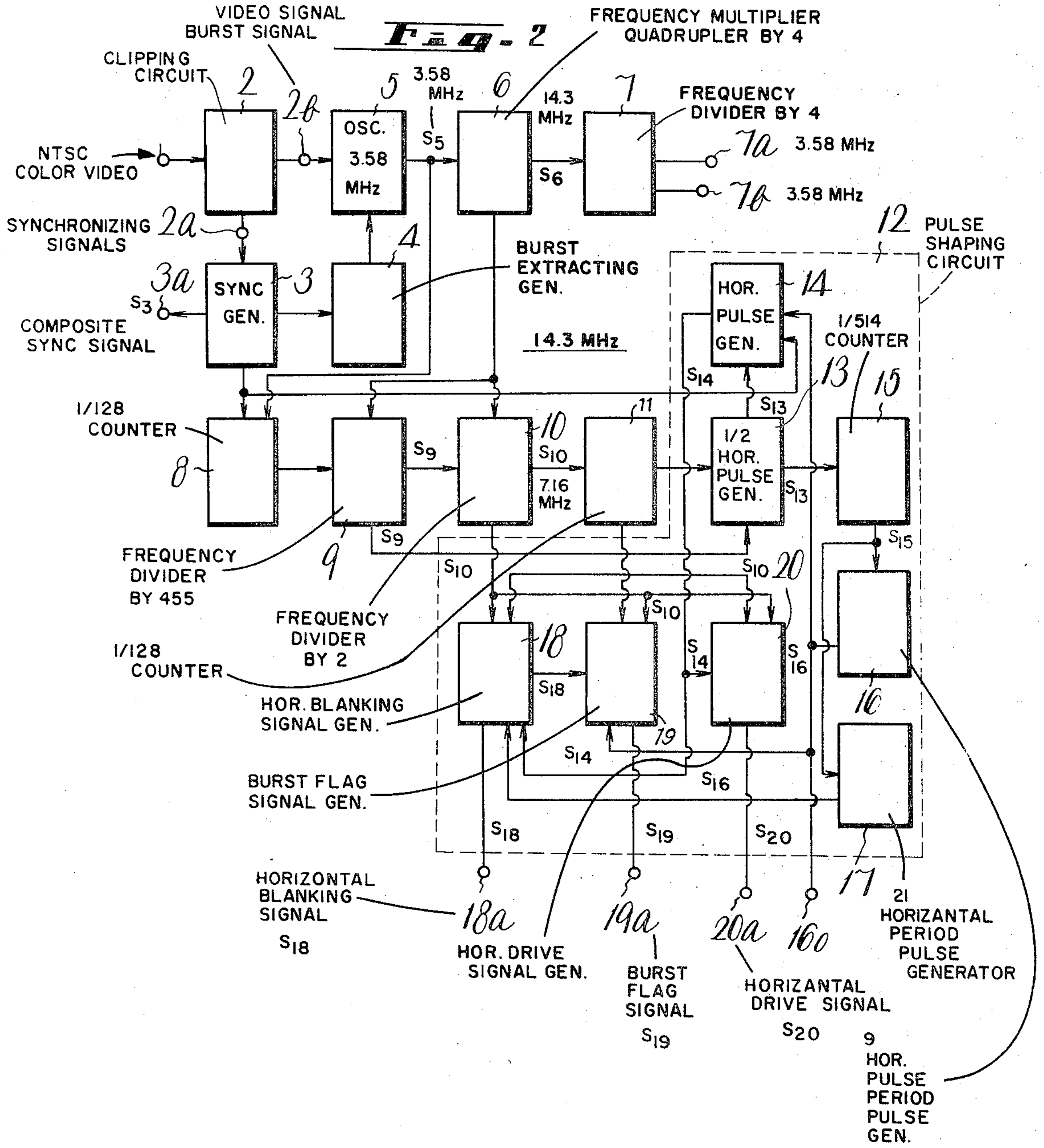
FIG. 2 is a block diagram illustrating one example of a color synchronizing signal generating device of this invention.

With reference to FIG. 2, a description will be given of one example of a color synchronizing signal generating device of this invention.

Figures 1A, 1B, 1C, 4A, 4B, 4C, 4D:
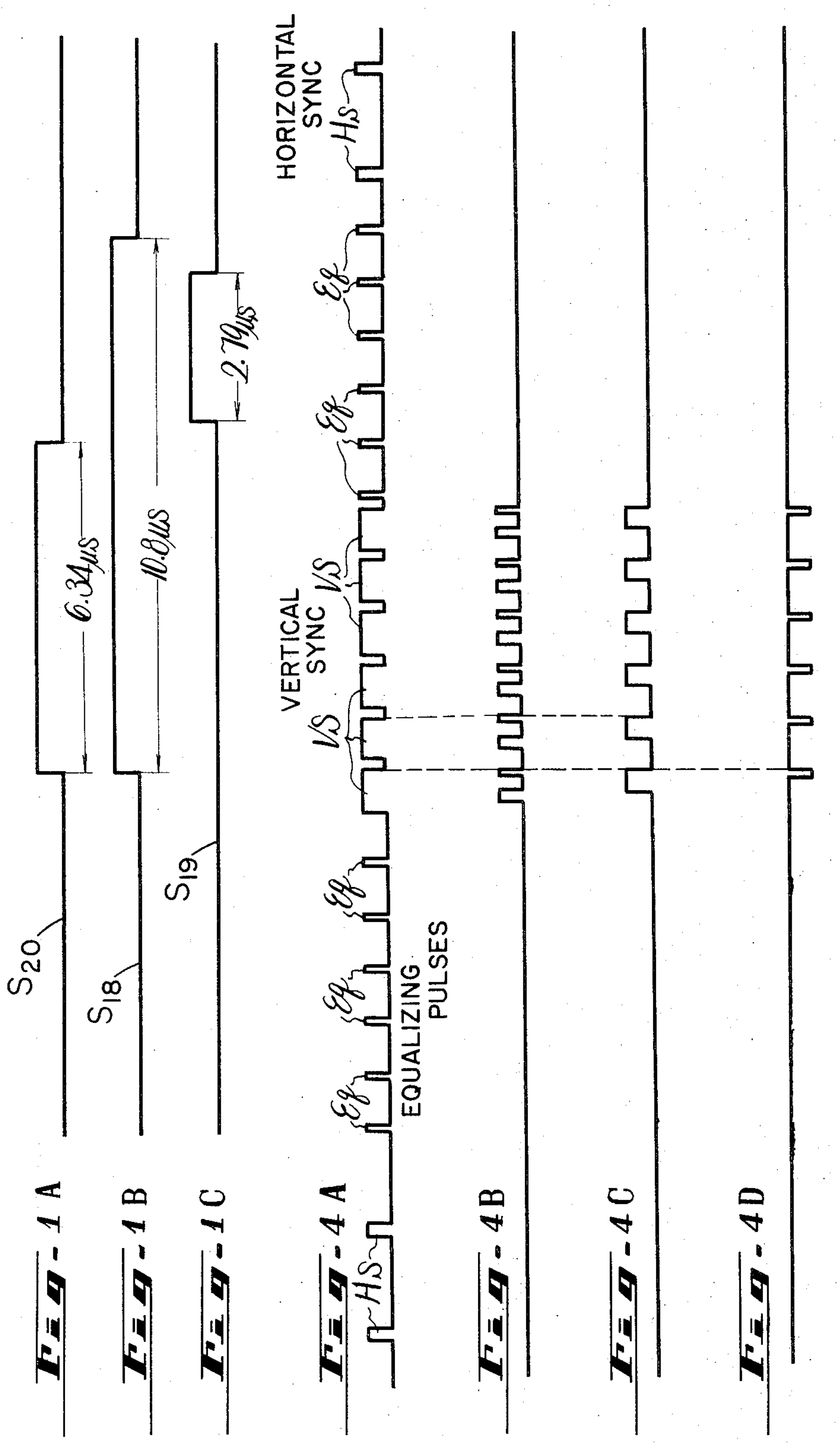
FIGS. 1A–1C schematically shows examples of signals derived from a color synchronizing signal generating device.
FIGS. 4A–4D, 7A–7H, 11A–11D and 13A–13F, inclusive, are waveform diagrams for explaining this invention.
Figure 3:
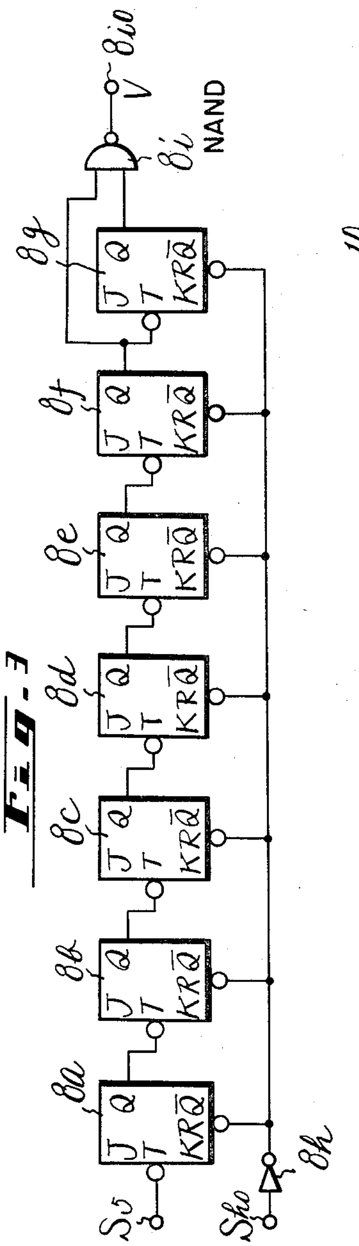
FIGS. 3, 5, 6, 8, 9, 10, 12 and 14, inclusive, are connection diagrams showing examples of the principal part of this invention.
Figure 6:
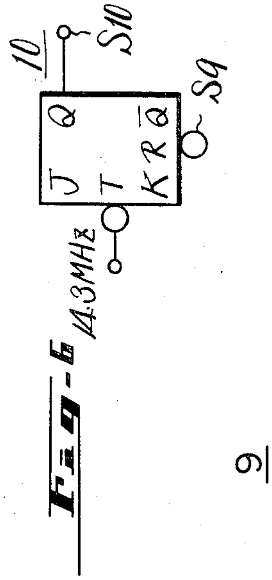
Figure 5:
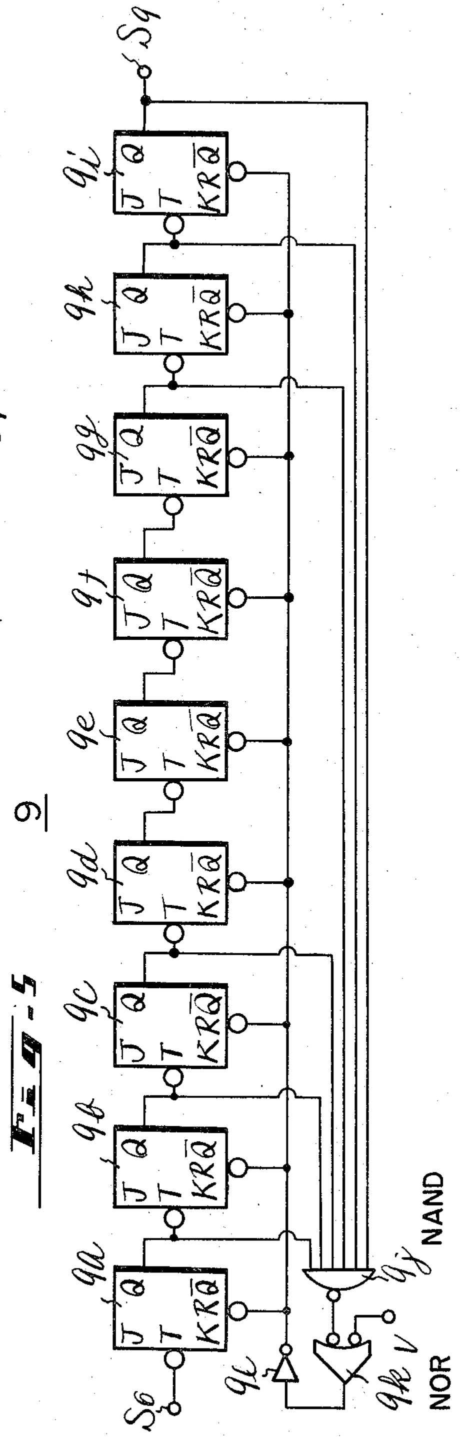
Figures 7A, 7B, 7C, 7D, 7E, 7F, 7G, 7H, 11A, 11B, 11C, 11D:
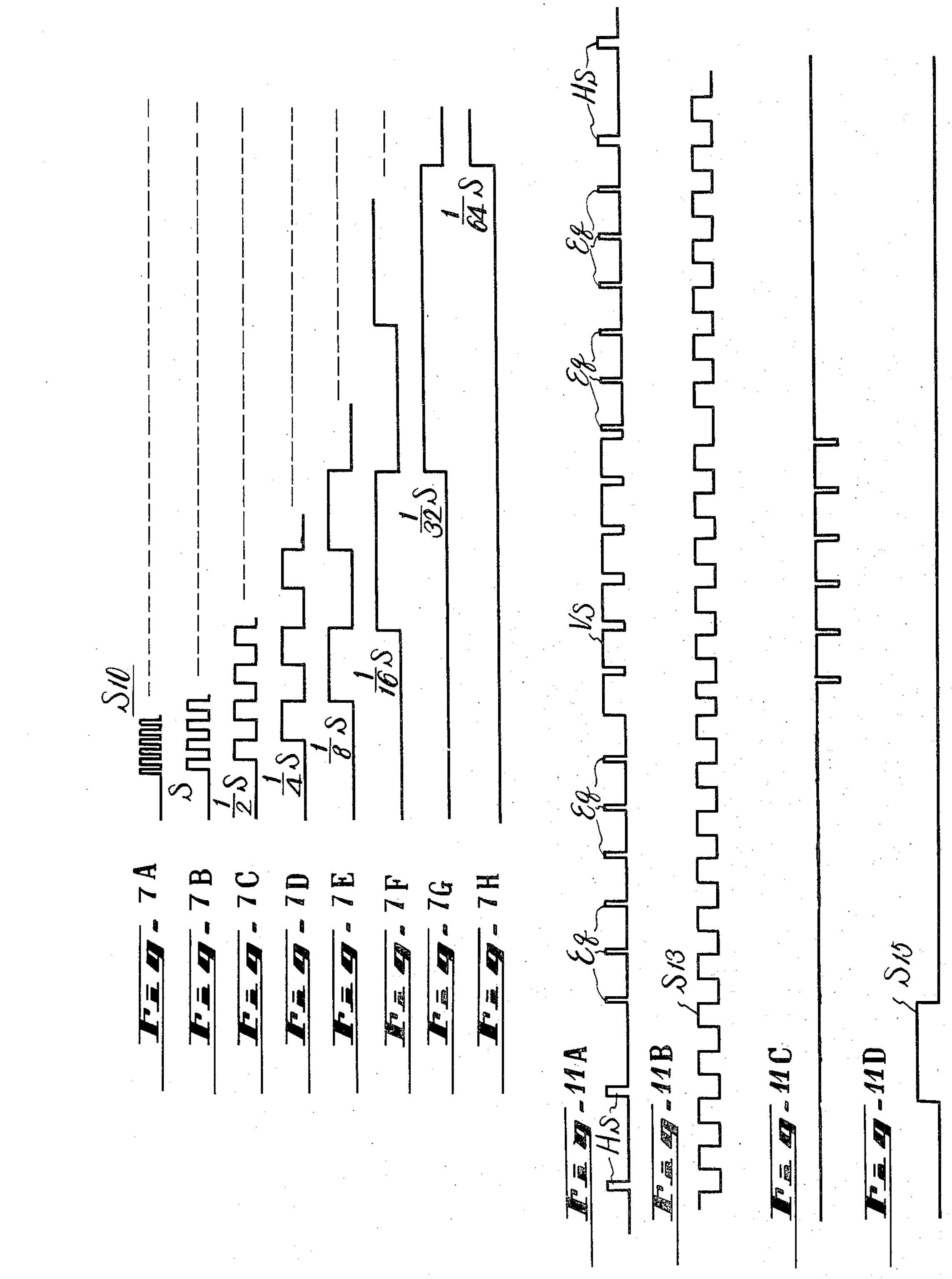
Figure 9:
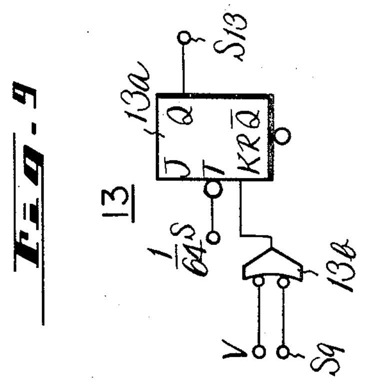
Figure 8:
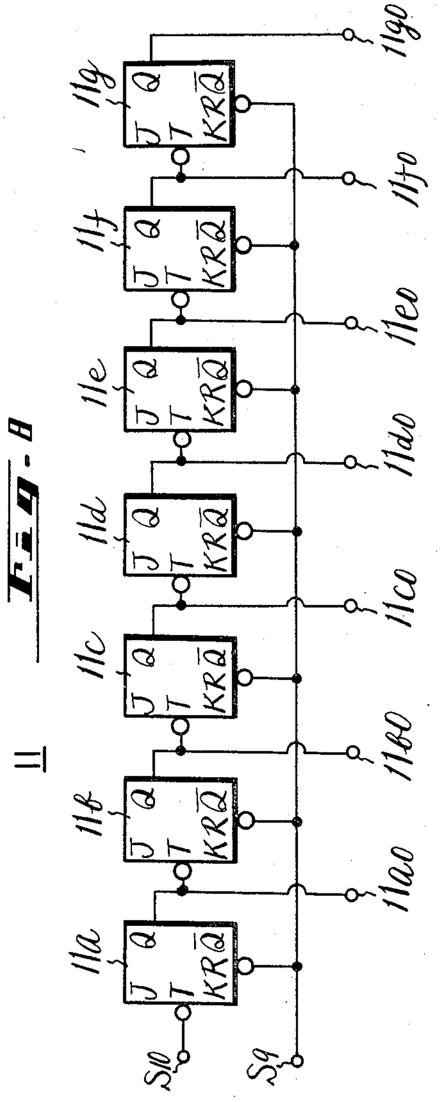
Figure 10:
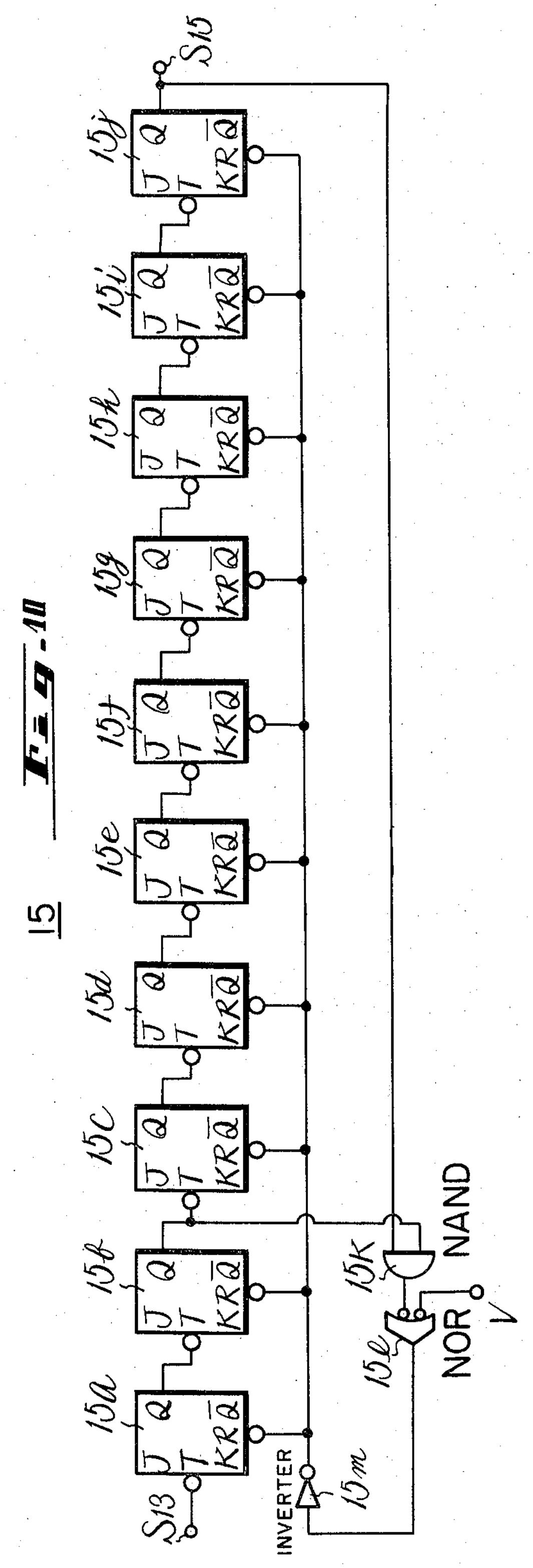
Figure 12:
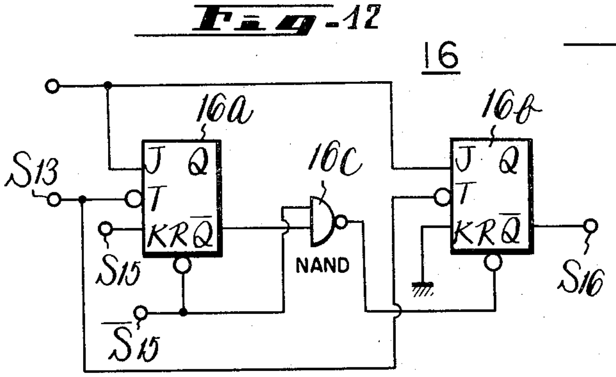
Figure 14:
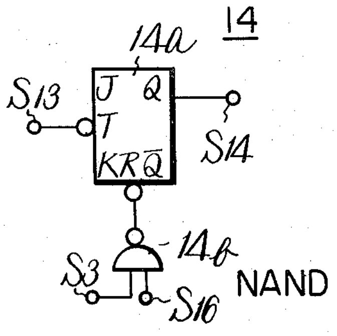
Figures 13A, 13B, 13C, 13D, 13E, 13F:
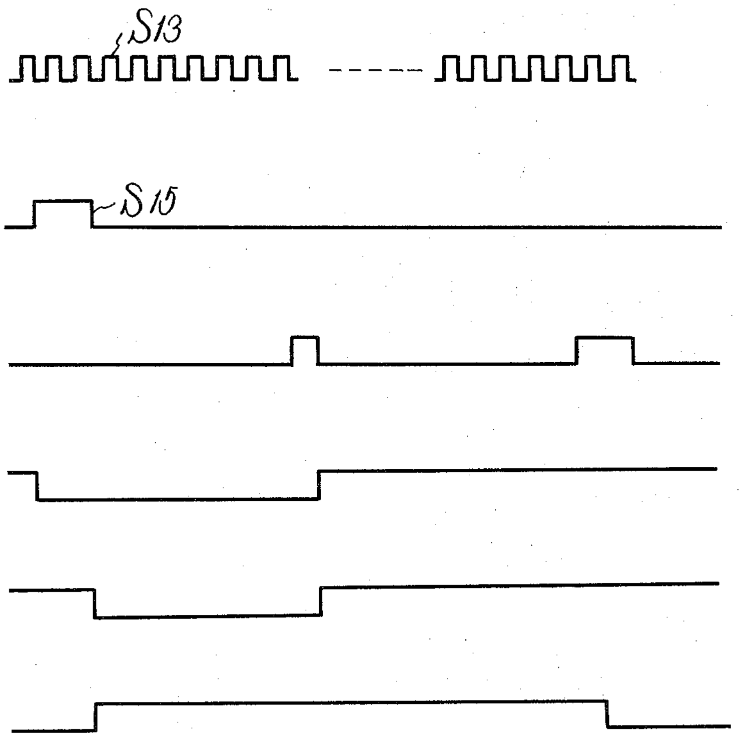

In FIG. 2, reference numeral 1 indicates an NTSC color video signal input terminal to which is supplied an ordinary NTSC color video signal. The NTSC color video signal supplied to the input terminal 1 is applied to a clipping circuit 2 to be divided into a synchronizing component signal, that is, a signal composed of only vertical and horizontal synchronizing signals and an equalizing pulse signal and a video component signal, that is, a signal composed of a video signal and a burst signal. The synchronizing component signal is derived at the one output terminal 2*a* of the clipping circuit 2, while the video component signal is at the other output terminal 2*b*. The synchronizing component signal thus derived at the output terminal 2*a* of the clipping circuit 2 is supplied to a synchronizing signal generator 3 and is thereby shaped in waveform to provide at its output terminal 3*a* a composite synchronizing signal $S_3$ such as shown in FIG. 4A. In FIG. 4A, reference character VS indicates a vertical synchronizing signal, HS a horizontal synchronizing signal and Eq an equalizing pulse. Further, the composite synchronizing signal derived at the output of the synchronizing signal generator 3 is fed to a burst extracting signal generator 4, in which the phase of the composite synchronizing signal is shifted to provide a burst extracting signal. With the output of the burst extracting signal generator 4, that is, the burst extracting signal, a burst signal is extracted from the video component signal derived at the other output terminal 2*b* of the clipping circuit 2. The burst signal thus obtained is supplied to an oscillator 5 of about 3.58MHz formed with, for example, a quartz oscillator which is provided with an automatic phase control device and stable in oscillation, thus deriving at the output of the oscillator 5 an oscillation signal $S_5$ of about 3.58MHz which is coincident in phase with the burst signal contained in the color video signal fed to the input terminal 1. The output signal $S_5$ from the oscillator 5 is supplied to a frequency quadrupler 6 to derive a signal $S_6$ of about 14.3MHz at its output. The output signal $S_6$ from the frequency quadrupler 6 is fed to a frequency divider 7 which divides by four to provide at its output terminals 7*a* and 7*b* respectively subcarrier signals of approximately 3.58MHz which are displaced 90° apart in phase from each other. Further, the composite synchronizing signal $S_3$ derived from the synchronizing signal generator 3 and the signal $S_5$ of about 3.58 MHz from the oscillator 5 are both supplied to a 1/128 counter 8 to derive a vertical pulse signal V at its output. The 1/128 counter 8 is formed with, for example, seven J-K flip-flop circuits 8*a*, 8*b*, 8*c*, . . . . . and 8*g* as shown in FIG. 3. The signal $S_5$ of about 3.58MHz is supplied to a trigger terminal T of the first J-K flip-flop circuit 8*a*, the output terminal Q of which is connected to the trigger terminal T of the second J-K flip-flop circuit 8*b*, the output terminal Q of which is, in turn, connected to the trigger terminal T of the third J-K flip-flop circuit 8*c*. In a similar manner, the output terminals Q of the third, fourth, fifth and sixth J-K flip-flop circuits 8*c*, 8*d*, 8*e* and 8*f* are sequentially connected to the trigger terminals T of the fourth, fifth, sixth and seventh J-K flip-flop circuits 8*d*, 8*e*, 8*f* and 8*g* respectively. Reference numeral 8*h* designates an inverter circuit, whose input terminal $8h_O$ is supplied with the composite synchronizing signal $S_3$ such as depicted in FIG. 4A. The output from the inverter circuit 8*h* is applied to reset terminals R of the J-K flip-flop circuits 8*a*, 8*b*, 8*c*, . . . . . and 8*g* respectively and signals such as shown in FIGS. 4B and 4C which are derived at the output terminals Q of the J-K flip-flop circuits 8*f* and 8*g* are supplied to the input side of a NAND circuit 8*i* to derive at its output terminal $8i_O$ a vertical pulse signal V such as depicted in FIG. 4D. Reference numeral 9 indicates a frequency divider which divides by 455, which is supplied with the output from the frequency quadrupler 6, that is, the signal $S_6$ of approximately 14.3MHz and the vertical pulse signal V derived from the 1/128 counter 8, thereby providing at the output of the frequency divider 9 a 1/2 horizontal pulse $S_9$ which is synchronized with the leading edge of the vertical synchronizing signal VS. The frequency divider 9 is formed with, for example, nine J-K flip-flop circuits 9*a*, 9*b*, 9*c*, . . . . . and 9*i* as illustrated in FIG. 5. The output from the frequency quadrupler 6, that is, the signal $S_6$ of about 14.3MHz is supplied to the trigger terminal T of the first flip-flop circuit 9a, the output terminal Q of which is connected to the trigger terminal T of the second J-K flip-flop circuit 9*b*, the output terminal Q of which is, in turn, connected to the trigger terminal T of the third J-K flip-flop circuit 9*c*. In a like manner, the output terminals Q of the subsequent third, fourth, fifth, six, seventh and eighth J-K flip-flop circuits 9*c*, 9*d*, 9*e*, 9*f*, 9*g* and 9*h* are sequentially connected to the trigger terminals T of the fourth, fifth, sixth, seventh, eighth and nine J-K flip-flop circuits 9*d*, 9*e*, 9*f*, 9*g*, 9*h* and 9*i* respectively. The output terminals Q of the J-K flip-flop circuits 9*a*, 9*b*, 9*c*, 9*g*, 9*h* and 9*i* are connected to the input side of NAND circuit 9*j* and the output terminal of the NAND circuit 9*j* and that of the 1/128 counter 8 are connected to the input side of a NOR circuit 9*k*, the output terminal of which is connected through an inverter circuit 91 to reset terminals R of the J-K flip-flop circuits *9a*, *9b*, *9c*, . . . . and *9i* respectively to obtain at the output terminal Q of the J-K flip-flop circuit *9i* a 1/2 horizontal pulse $S_9$ which is synchronized with the leading edge of the vertical synchronizing signal VS. Reference numeral 10 designates a frequency divider which divides by two, which is supplied with the output from the frequency quadrupler 6, that is, the signal of about 14.3MHz and the output signal $S_9$ from the frequency divider 9, thus deriving at the output of the frequency 10 a clock pulse $S_{10}$ of about 7.16MHz such as shown in FIG. 7A which is 1/2 the output of the frequency quadrupler 6 and synchronized with the output signal $S_9$. The frequency divider 10 is such a J-K flip-flop circuit as depicted in FIG. 6. The output signal of about 14.3 MHz from the frequency quadrupler 6 is applied to the trigger terminal T of the J-K flip-flop circuit and the output signal $S_9$ of the 1/455 frequency divider 9 is supplied to its reset terminal R to provide at its output terminal Q a clock pulse $S_{10}$ of approximately 7.16 MHz such as shown in FIG. 7A. The clock pulse $S_{10}$ thus derived at the output of the frequency divider 10 is fed to a 1/128 counter 11. The 1/128 counter 11 is formed with seven J-K flip-flop circuits 11*a*, 11*b*, 11*c*, . . . . . and 11g as illustrated in FIG. 8. The output signal $S_{10}$ from the frequency divider 10 is applied to the trigger terminal T of the first J-K flip-flop circuit 11*a*, the output terminal Q of which is connected to the trigger terminal T of the second J-K flip-flop circuit 11*b*, the output terminal Q of which is, in turn, connected to the trigger terminal T of the third J-K flip-flop circuit 11*c*. Likewise, the output terminals Q of the subsequent third, fourth, fifth and sixth J-K flip-flop circuits 11*c*, 11*d*, 11*e* and 11*f* are sequentially connected to the trigger terminals T of the fourth, fifth, sixth and seventh J-K flip-flop circuits 11*d*, 11*e*, 11*f* and 11*g* respectively. The output signal $S_9$ from the frequency divider 9 is supplied to reset terminals R of the J-K flip-flop circuits 11*a*, 11*b*, 11*c*, . . . . . and 11*g* respectively, the output terminals Q of which are connected to output terminals $11a_O$, $11b_O$, $11c_O$, . . . . . and $11g_O$ respectively. In this case, a clock pulse of about 3.58MHz such as depicted in FIG. 7B is derived at the output terminal $11a_O$. If the frequency of the logic pulse obtained at the output terminal $11a_O$ is taken as S, output signals derived at the output terminals $11b_O$, $11c_O$, $11d_O$, $11e_O$, $11f_O$ and $11g_O$ are logic pulses such as shown in FIGS. 7C, D, E, F, G and H which have frequencies 1/2S, 1/4S, 1/8S, 1/16S, 1/32S and 1/64S respectively. The symbols of these logic pulses will hereinafter be referred to as S, 1/2S, 1/4S, 1/8S, 1/16S, 1/32S and 1/64S. Further, the output signal $S_3$ from the synchronizing signal generator 3, the output signal $S_9$ of the frequency divider 9, the clock pulse signal $S_{10}$ from the frequency divider 10 and the logic pulses, S, 1/2S, 1/4S, 1/8S, 1/16S, 1/32S and 1/64S from the 1/128 counter 11 are supplied to a pulse shaping circuit 12 respectively. The pulse shaping circuit 12 comprises a 1/2 horizontal pulse generator 13 formed with a logic circuit for generating a 1/2 horizontal pulse synchronized with the leading edge of the horizontal synchronizing signal, a horizontal pulse generator 14, a 1/514 counter 14, a 9-horizontal-period pulse generator 16, a 21-horizontal-period pulse generator 17, a horizontal blanking signal generator 18, a burst flag signal generator 19 and a horizontal drive signal generator 20. The 1/2 horizontal pulse generator 13 is formed with one J-K flip-flop circuit 13*a* as depicted in FIG. 9. The logic pulse 1/64S is supplied to its trigger terminal T and the output from a NOR circuit 13*b*, the input side of which is supplied with the vertical pulse signal V and the output signal $S_9$ from the frequency divider 9, is supplied to a K terminal of the circuit 13*a* to derive at its output terminal Q a 1/2 horizontal pulse signal $S_{13}$ synchronized with the leading edge of the horizontal synchronizing signal. The 1/514 counter 15 is formed with ten J-K flip-flop circuits 15*a*, 15*b*, 15*c*, . . . . . and 15*j* as shown in FIG. 10. The output signal $S_{13}$ from the 1/2 horizontal pulse generator 13 such as depicted in FIG. 11B is supplied to the trigger terminal T of the first J-K flip-flop circuit 15*a*, the output terminal Q of which is connected to the trigger terminal T of the second J-K flip-flop circuit 15*b*, the output terminal Q of which is, in turn, connected to the trigger terminal T of the third J-K flip-flop circuit 15*c*. Similarly, the output terminals Q of the third to ninth J-K flip-flop circuits 15*c* to 15*i* are sequentially connected to the trigger terminals T of the fourth to tenth J-K flip-flop circuits 15*d* to 15*j* respectively. The output terminals Q of the J-K flip-flop circuits 15*b* and 15*j* are connected to the input side of a NAND circuit 15*k* respectively and the output terminal of NAND circuit 15*k* and that of the 1/128 counter 8 at which the vertical pulse signal V is obtained are connected to the input side of a NOR circuit 151, the output terminal of which is connected to the input side of an inverter circuit 15*m* to provide at its output terminal such a signal as shown in FIG. 11C. The output signal derived at the output terminal of the inverter circuit 15m is applied to reset terminals of the J-K flip-flop circuits 15*a* to 15*j* respectively to obtain at the output terminal of the 1/514 counter 15 a pulse signal $S_{15}$ such as depicted in FIG. 11D which is synchronized with the trailing edge of the vertical drive signal. FIG. 11A illustrates a composite synchronizing signal. The 9-horizontal-period pulse generator 16 is formed with two J-K flip-flop circuits 16*a* and 16*b* as illustrated in FIG. 12. The 1/2 horizontal pulse signal $S_{13}$ such as shown in FIG. 13A is applied to the trigger terminals T of the J-K flip-flop circuits 16*a* and 16*b* and the output signal $S_{15}$ such as depicted in FIG. 13B which is derived from the 1/514 counter 15 is fed to a K terminal of the J-K flip-flop circuit 16*a*. A signal such as shown in FIG. 13C, which is produced by supplying an AND circuit with signals derived at the output terminals Q of the J-K flip-flop circuits 15*b* and 15*c* of the 1/514 counter 15, is applied to J terminals of the J-K flip-flop circuits 16*a* and 16*b* and a signal $\overline{S_{15}}$ produced by reversing the phase of the output signal $S_{15}$ is supplied to the reset terminal R of the J-K flip-flop circuit 16*a* and the input side of a NAND circuit 16*c*. Further, a signal such as depicted in FIG. 13D, which is derived at a NOT output terminal $\overline{Q}$ of the J-K flip-flop circuit 16*a*, is applied to the input side of the NAND circuit 16*c* and a signal such as shown in FIG. 13E, which is obtained at the output of the NAND circuit 16*c*, is supplied to the reset terminal R of the J-K flip-flop circuit 16*b* and the K terminal of the J-K flip-flop circuit 16b is grounded. Thus, a 9-horizontal-period pulse signal, that is, a vertical drive signal $S_{16}$ such as illustrated in FIG. 13F is derived at the NOT output terminal $\overline{Q}$ of the J-K flip-flop circuit 16*b*, that is, at the output terminal $16_O$ of the 9-horizontal-period pulse generator 16. The horizontal pulse signal generator 14 is formed with one J-K flip-flop circuit 14*a* as shown in FIG. 14, the trigger terminal T of which is supplied with the 1/2 horizontal pulse signal $S_{13}$ and the reset terminal R of which is supplied with the output of a NAND circuit 14*b* supplied at its input side with the composite synchronizing signal $S_3$ and the 9-horizontal-period pulse signal $S_{16}$ thus providing a horizontal pulse signal $S_{14}$ at the output terminal of the horizontal pulse signal generator 14, that is, the output terminal Q of the J-K flip-flop circuit 14*a*. The 21-horizontal-period pulse generator 17, the horizontal blanking signal generator 18, the burst flag signal generator 19 and the horizontal drive signal generator 20 are also formed with logic circuits respectively. The 21-horizontal-period pulse generator 17 is supplied with the output signal $S_{15}$ from the 1/514 counter 15 to derive a 21-horizontal-period pulse signal $S_{17}$ at its output. The horizontal blanking signal generator 18 is supplied with the output signal $S_{10}$ from the frequency divider 10, the logic pulse from the 1/128 counter 11, the output signal $S_{14}$ from the horizontal pulse generator 14 and the output signal $S_{17}$ from the 21-horizontal-period pulse generator 17, at an output terminal 18*a* of the horizontal blanking signal generator 18 a horizontal blanking signal $S_{18}$ as shown in FIG. 1B. The burst flag signal generator 19 is supplied with the output signal $S_{10}$ from the frequency divider 10, the logic pulse from the 1/128 counter 11, the output signal $S_{18}$ from the horizontal blanking signal generator 18 and the output signal $S_{16}$ from the 9-horizontal-period pulse generator 16, thereby to provide at an output terminal 19*a* of the burst flag signal generator 19 such a burst flag signal $S_{19}$ as depicted in FIG. 1C. Further, the horizontal drive signal generator 20 is supplied with the output signal $S_{10}$ from the frequency divider 10, the logic pulse from the 1/128 counter 11 and the output signal $S_{14}$ from the horizontal drive pulse generator 14 to obtained at an output terminal 20*a* of the horizontal drive signal generator 20 a horizontal drive signal $S_{20}$ such as shown in FIG. 1A.

With the present invention, it is possible to obtain from an NTSC color video signal being broadcast the composite synchronizing signal $S_3$, a subcarrier signal, the vertical drive signal $S_{16}$, the horizontal blanking signal $S_{18}$, the burst flag signal $S_{19}$ and the horizontal drive signal $S_{20}$ which are necessary for color television image pickup apparatus.

Since the present invention is designed to obtain the color synchronizing signal only with logic circuits as described in the foregoing, color signals of accurate phase relationship can be obtained without involving any adjustment. Further, the device of the present invention does not employ any capacitors and coils, and hence is extremely suitable for fabrication as an integrated circuit. Moreover, the device of this invention is formed with logic circuits, without using an integrator circuit, a one-shot multivibrator and so on which are unstable with respect to temperature, so that the temperature characteristic of this device is dependent upon that of the logic circuit and is extremely stable.

It will be apparent that many modifications and variations may be effected without departing from the scope of the novel concepts of this invention.

I claim as my invention:

1. A color synchronizing signal generating device comprising a clipping circuit supplied with an NTSC color video signal, a synchronizing signal generator supplied with a synchronizing component signal derived at a first output of said clipping circuit to provide a synchronizing signal, a burst signal extracting signal generator for generating a burst extracting signal receiving an input from said synchronizing signal generator, an oscillator supplied with a video component signal derived from a second output of said clipping circuit and receiving an input from said burst extracting signal generator to produce a signal of about 3.58MHz synchronized with a burst signal contained in the video signal, a frequency quadrupler receiving the output of said oscillator and multiplying the frequency by four, a 1/128 counter receiving the output of said synchronizing signal generator and an output of about 3.58MHz from said oscillator to produce a vertical pulse signal, a frequency divider by 455 receiving the output of said frequency quadrupler and receiving an input from said 1/128 counter, a frequency divider dividing frequency by two receiving an output of said frequency quadrupler and dividing down to 1/2 and receiving an input from said frequency divider dividing by 455, a second 1/128 counter receiving output from said frequency divider by two to derive a logic pulse at its output, and a pulse shaping and generator circuit formed with logic circuits receiving the output from said frequency divider, dividing by 455, the output from said second frequency divider by two and the logic pulse from said 1/128 counter to derive horizontal and vertical drive signals, a blanking signal, and a burst flag signal at its outputs.

2. A color synchronizing signal generating device according to claim 1 wherein said pulse shaping generator includes, a horizontal blanking signal generator producing a horizontal blanking signal receiving outputs from said frequency divider by two and said second 1/128 counter, a horizontal pulse generator receiving an input from said synchronizing signal generator and supplying an input to said horizontal blanking signal generator, a 1/2 horizontal pulse generator receiving an input from said second 1/128 counter and said frequency divider by 455 and supplying an input to said horizontal pulse generator, a 1/514 counter receiving an input from said 1/2 horizontal pulse generator, a 9 horizontal pulse period generator receiving the output of said 1/514 counter, and supplying an input to said horizontal pulse generator, and a 21 horizontal period pulse generator receiving an input from said 1/514 counter and supplying an input to said horizontal blanking signal generator.

3. A color synchronizing signal generator according to claim 2 including a burst flag signal generator producing a burst flag signal and receiving inputs from said frequency divider by two, said second 1/128 counter, said horizontal blanking signal generator and said 9 horizontal pulse period generator.

4. A color synchronizing signal generator according to claim 3 including a horizontal drive signal generator producing a horizontal drive signal and receiving inputs from said horizontal pulse generator, said second 1/128 counter, and said frequency divider by two.

5. A color synchronizing signal generating device comprising:

a. a clipping circuit supplied with an NTSC color video signal;

b. a synchronizing signal generator connected to the clipping circuit and receiving a synchronizing component signal derived at a video signal output of the clipping circuit to provide a synchronizing signal;

c. a burst signal extracting signal generator connected to the synchronizing signal generator for generating a burst extracting signal synchronized with the synchronizing signal derived from the synchronizing signal generator;

d. an oscillator connected to said clipping circuit and said burst signal extracting signal generator and supplied with a video component signal derived at a synchronizing signal output of said clipping circuit and said burst extracting signal derived from said burst extracting signal generator to produce a signal of about 3.58MHz synchronized with a burst signal contained in the video signal;

e. a frequency quadrupler connected to said oscillator and quadrupling the output from the oscillator;

f. A 1/128 counter supplied with the output from the synchronizing signal generator and the output of about 3.58MHz from said oscillator to obtain a vertical pulse signal;

g. a frequency divider dividing by 455 for frequency receiving the output of the frequency quadrupler to divide it in synchronism with the output from the 1/128 counter;

h. a frequency divider dividing by two receiving the output of the frequency quadrupler to divide it in synchronism with the output from the frequency divider by 455;

i. a 1/128 counter supplied with the output from the frequency divider by two to derive a logic pulse at its output; and j. a pulse generator circuit formed with logic circuits supplied with the output from the frequency divider by 455 the output from the frequency divider by two and the logic pulse to derive horizontal and vertical drive signals, a blanking signal and a burst flag signal at the output of said pulse generator circuit.

* * * * *